(12) United States Patent  
Lee

(10) Patent No.: US 9,218,001 B2  
(45) Date of Patent: Dec. 22, 2015

(54) WIRELESS INDUCEMEMT SYSTEM AND AUTO DRIVING APPARATUS FOR DRIVING VEHICLE AND METHOD OF DRIVING THE SAME

(71) Applicant: Electronics and Telecommunications Research Institute, Daejeon (KR)

(72) Inventor: Seok-Jin Lee, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 14/038,430

(22) Filed: Sep. 26, 2013

(65) Prior Publication Data

US 2014/0088796 A1 Mar. 27, 2014

(30) Foreign Application Priority Data

Sep. 26, 2012 (KR) .................. 10-2012-0107398  
Sep. 25, 2013 (KR) .................. 10-2013-0113602

(51) Int. Cl.

| G05D 1/00 | (2006.01) |
| G05D 3/00 | (2006.01) |
| G06F 7/00 | (2006.01) |
| G06F 17/00 | (2006.01) |
| G05D 1/02 | (2006.01) |
| G06F 17/10 | (2006.01) |
| G06G 7/78 | (2006.01) |
| G08G 1/16 | (2006.01) |

(52) U.S. Cl.
CPC ............ G05D 1/0011 (2013.01); G05D 1/0263 (2013.01); *G05D 2201/0213* (2013.01); *G06F 7/00* (2013.01); *G08G 1/16* (2013.01)

(58) Field of Classification Search
CPC .................................... G08G 1/16; G01S 5/14  
USPC .................................. 342/357.06; 701/301, 2  
See application file for complete search history.

(56) References Cited

U.S. PATENT DOCUMENTS

2002/0022927 A1* 2/2002 Lemelson et al. ............ 701/301  
2008/0062042 A1* 3/2008 O'Brien ................... 342/357.06

FOREIGN PATENT DOCUMENTS

| JP | 2009-075754 A | 4/2009 |
| KR | 10-2005-0081794 A | 8/2005 |
| KR | 10-2012-0072043 A | 7/2012 |

* cited by examiner

*Primary Examiner* — Helal A Algahaim  
*Assistant Examiner* — Mahmoud Ismail

(57) ABSTRACT

A wireless inducement system and an auto driving apparatus for driving a vehicle and a method of driving the same are provided. The wireless inducement system includes an implanted road positioning signaler, an auto driving apparatus, and smart roadside equipment. The implanted road positioning signaler is installed in a lane and transmits a reference location wireless signal including information about location coordinates and an electric wave sending time. The auto driving apparatus grasps a location using the received reference location wireless signal and performs auto driving, and the smart roadside equipment transmits situation information about an adjacent region of the vehicle to the auto driving apparatus.

18 Claims, 7 Drawing Sheets

WIRELESS INDUCEMEMT SYSTEM AND AUTO DRIVING APPARATUS FOR DRIVING VEHICLE AND METHOD OF DRIVING THE SAME

CROSS-REFERENCE TO RELATED APPLICATION

This application claims priority to and the benefit of Korean Patent Application No. 10-2012-0107398 and No. 10-2013-0113602 filed in the Korean Intellectual Property Office on Sep. 26, 2012 and Sep. 25, 2013, respectively, the entire contents of which are incorporated herein by reference.

BACKGROUND OF THE INVENTION (a) Field of the Invention

The present invention relates to a wireless inducement system and an auto driving apparatus for driving a vehicle, and a method of driving the same.

(b) Description of the Related Art

Currently, much research on vehicles having an unmanned driving function that automatically drive to a destination without a driver's manipulation is being performed. According to an existing method, an auto driving vehicle analyzes data that is obtained through various sensors such as a satellite navigation device, an inertial navigation device, radar, an ultrasonic wave measuring device, a laser scanner, and a camera that are mounted in the vehicle with an internal computer, grasps a form and an obstacle of a road based on analyzed information, and generates driving information.

For example, an auto driving vehicle determines a lane with a camera instead of a driver's naked eye, and acquires a distance of an adjacent obstacle using radar. Because such a method determines an obstacle that is positioned on a driving path based on a sensor recognition ability, a sensor recognition range should be wide and reliability with regard to resolution and accuracy should be high. Further, in order to reflect a high speed driving situation of the vehicle, there is a problem that information that is acquired from a sensor should be processed at a high speed.

There is a drawback that in an inertial navigation device, an error is continuously accumulated, and a satellite navigation device has a restriction in space and time.

For an unmanned driving function, a long distance situation of a driving direction should be known, and an adjacent obstacle situation should be immediately known. However, the above conventional auto driving vehicle determines the situation and performs auto driving itself, and road equipment does not actively intervene.

SUMMARY OF THE INVENTION

The present invention has been made in an effort to provide a wireless inducement system and an auto driving apparatus for driving a vehicle, and a method of driving the same, having advantages of driving the vehicle with high stability and accuracy.

An exemplary embodiment of the present invention provides a wireless inducement system. The wireless inducement system includes: a plurality of implanted road positioning signalers (IRPS) that are installed in a lane and that transmit a reference location wireless signal including information about location coordinates and an electric wave sending time; an auto driving apparatus that receives a reference location wireless signal from each of the plurality of IRPSes and that grasps a location and performs auto driving using the received reference location wireless signal; and smart roadside equipment (SRSE) that manages the plurality of IRPSes and that transmits situation information about an adjacent region of a vehicle in which the auto driving apparatus is mounted to the auto driving apparatus.

The plurality of IRPSes may include a first IRPS that is installed in a first lane, a second IRPS that is installed in a second lane that is parallel and adjacent to the first lane, and a third IRPS that is installed in a third lane that is adjacent to the first lane and the second lane.

The auto driving apparatus may calculate a distance of the vehicle from the center of the lane using a reference location wireless signal that is received from the first IRPS and a reference location wireless signal that is received from the second IRPS.

The auto driving apparatus may perform auto driving using the situation information.

The auto driving apparatus may include a data demodulation and pseudo random noise (PRN) code processor that compares a PRN code that is previously set therein and the reference location wireless signal, and that extracts a received signal arrival time and an intrinsic number of the plurality of IRPSES using code correlation, and an auto driving control apparatus that calculates the location using the intrinsic number and the received signal arrival time.

The auto driving apparatus may transmit speed, location, and advancing direction information of the vehicle to the SRSE.

The SRSE may manage synchronization, a sleep mode, and a wakeup mode of the plurality of IRPSes.

The plurality of IRPSes each may generate the reference location wireless signal using an intrinsic PRN code.

Another embodiment of the present invention provides an auto driving apparatus that is mounted in a vehicle and that automatically drives without a driver's manipulation. The auto driving apparatus includes: a positioning information receiving apparatus that receives reference location wireless signals from each of at least three IRPSes and that extracts a received signal arrival time and an intrinsic number of the IRPS from the IRPS; and an auto driving control apparatus that calculates a location of the vehicle using the intrinsic number and the received signal arrival time and that performs auto driving based on the calculated location of the vehicle, wherein the at least three IRPSes each include first and second IRPSes that are installed in a lane and that are installed in adjacent and parallel lanes.

The auto driving apparatus may calculate a distance of the vehicle from the center of the lane using a reference location wireless signal that is received from the first IRPS and a reference location wireless signal that is received from the second IRPS.

The positioning information receiving apparatus may include a high frequency converter that receives the reference location wireless signal and that converts the reference location wireless signal to a low frequency signal, and a data demodulation and PRN code processor that compares a PRN code that is previously set therein and the reference location wireless signal and that extracts the intrinsic number and the received signal arrival time using a code correlation.

The auto driving apparatus may transmit the calculated location of the vehicle and speed and direction information of the vehicle to the SRSE.

The auto driving apparatus may receive situation information about an adjacent region of the vehicle from the SRSE and perform auto driving using the situation information.

The auto driving apparatus may further include a plurality of antennas that are installed at a plurality of points, respectively, of the vehicle.

Yet another embodiment of the present invention provides a method of driving an auto driving apparatus that is mounted in a vehicle to automatically drive. The method includes: receiving a first reference location wireless signal from a first IRPS that is installed in a first lane; receiving a second reference location wireless signal from a second IRPS that is installed in a second lane that is parallel and adjacent to the first lane; receiving a third reference location wireless signal from a third IRPS that is installed in a third lane adjacent to the first and second lanes; calculating a location of the vehicle using the first, second, and third reference location wireless signals; and performing auto driving of the vehicle based on the calculated location of the vehicle.

The method may further include calculating a distance from a center point that is positioned between the first lane and the second lane to the vehicle using the first reference location wireless signal and the second reference location wireless signal.

The method may further include setting a direction of the vehicle to the center point using the distance.

The first, second, and third reference location wireless signals may include location coordinates and an electric wave sending time of the first, second, and third IRPSes, respectively.

The method may further include: transmitting the calculated location of the vehicle to an SRSE; receiving situation information about an adjacent region of the vehicle from the SRSE; and performing the auto driving using the situation information.

According to an exemplary embodiment of the present invention, by performing auto driving using a signal that is received from a wireless apparatus that is installed in a lane, auto driving with high stability and accuracy can be performed.

According to an exemplary embodiment of the present invention, because situation information of an adjacent region can be grasped through smart roadside equipment, a vehicle can know a state of a peripheral vehicle very quickly without directly viewing a motion of the peripheral vehicle. Because an advancing direction situation of the vehicle can be grasped from the SRSE even at a curved line segment in which a visual field is not secured, safety driving can be performed.

DETAILED DESCRIPTION OF THE EMBODIMENTS

Figure 1:
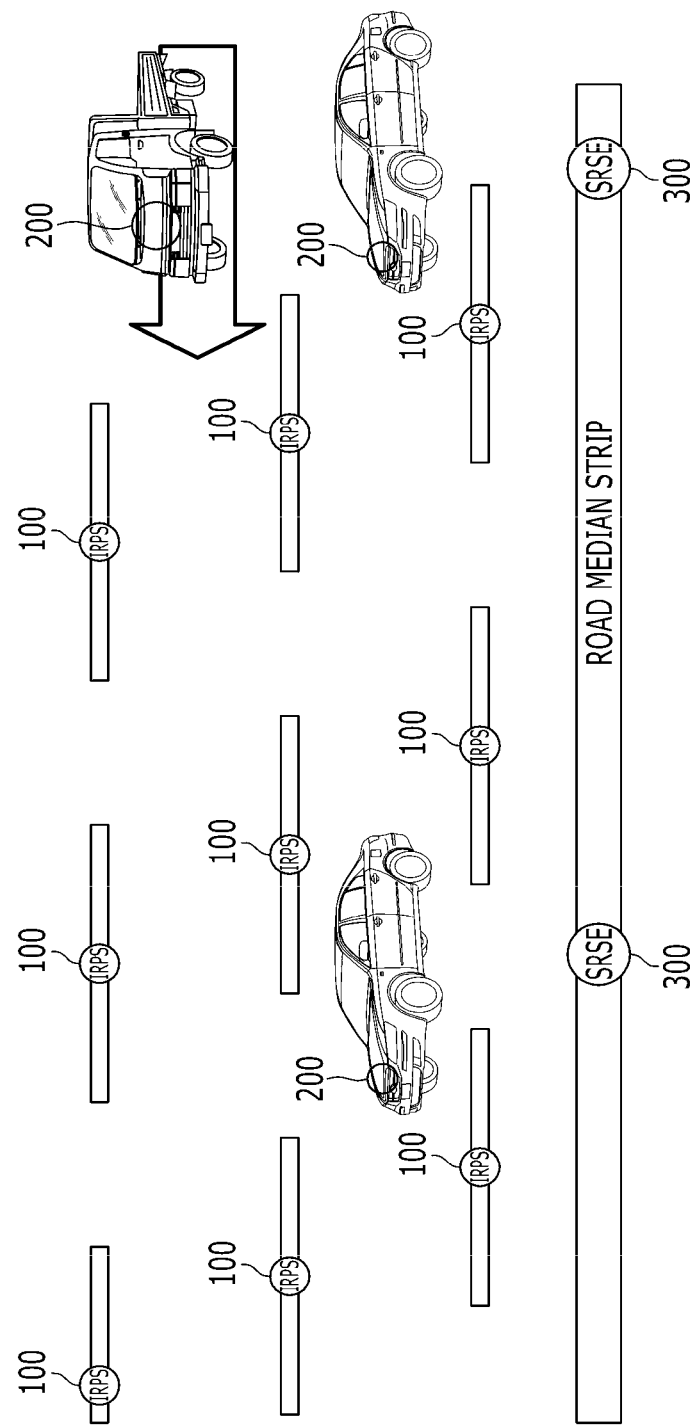
FIG. 1 is a diagram illustrating a wireless inducement system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, a wireless inducement system for driving a vehicle according to an exemplary embodiment of the present invention will be described in detail with reference to the drawings.

FIG. 1 is a diagram illustrating a wireless inducement system according to an exemplary embodiment of the present invention.

As shown in FIG. 1, the wireless inducement system according to an exemplary embodiment of the present invention includes an implanted road positioning signaler (IRPS) 100, an auto driving apparatus 200, and smart roadside equipment (SRSE) 300.

The IRPS 100 is installed on a road lane and performs a function of a global positioning system (GPS) satellite. The IRPS 100 transmits a reference location wireless signal to a vehicle driving to an adjacent region, and the auto driving apparatus 200 that is installed in the vehicle grasps a location of the vehicle using a reference location wireless signal that is received from the IRPS 100. The IRPS 100 is managed by the SRSE 300 that is installed at the outside of a road. That is, the IRPS 100 adjusts synchronization by the SRSE 300 and adjusts a sleep mode and a wakeup mode.

A plurality of IRPSes 100 that are positioned at a short range may form a group, and all IRPSes 100 belonging to the group may be operated with time synchronization and may send an electric wave signal of the same frequency band. A plurality of IRPSes 100 belonging to the same group each modulate data using an intrinsic pseudo random noise (PRN) code, and each IRPS is distinguished by the intrinsic PRN code. Data that is modulated by the PRN code includes location coordinates (hereinafter referred to as an "IRPS location coordinates") where the IRPS 100 is positioned, and a time (hereinafter referred to as an "electric wave sending time") that a reference location wireless signal is transmitted.

Figure 2:
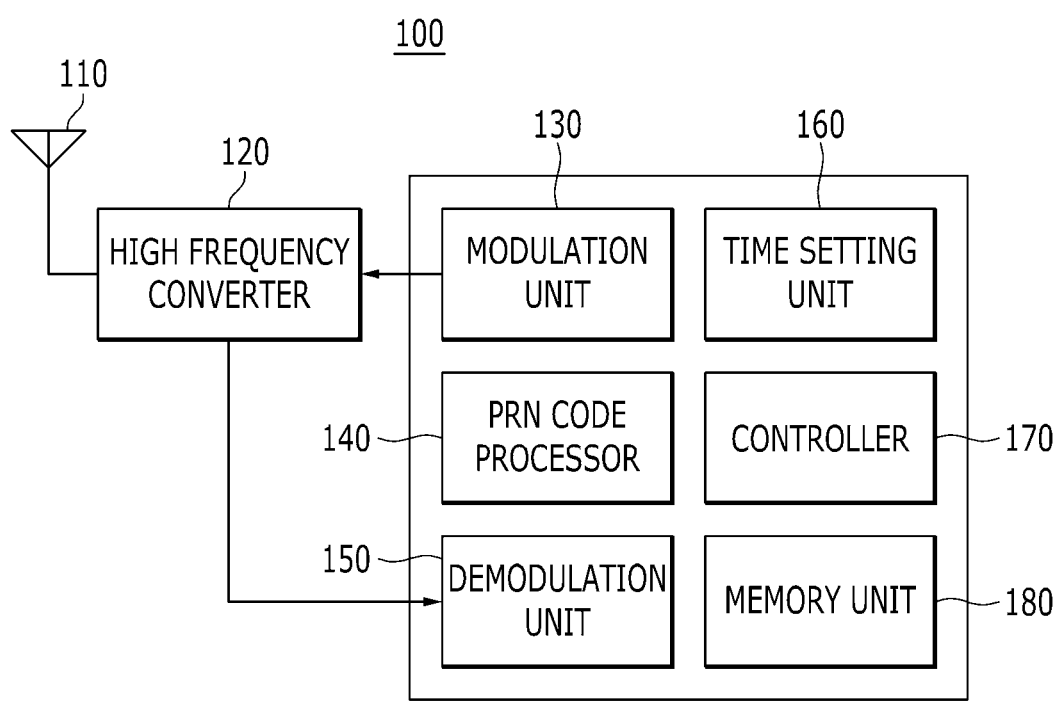
FIG. 2 is a block diagram illustrating a configuration of the IRPS 100 according to an exemplary embodiment of the present invention.

FIG. 2 is a block diagram illustrating a configuration of the IRPS 100 according to an exemplary embodiment of the present invention.

As shown in FIG. 2, the IRPS 100 according to an exemplary embodiment of the present invention includes an antenna 110, a high frequency converter 120, a modulation unit 130, a PRN code processor 140, a demodulation unit 150, a time setting unit 160, a controller 170, and a memory unit 180.

The antenna 110 receives or transmits a wireless signal, and the high frequency converter 120 converts a received high frequency signal to a low frequency signal or converts a low frequency signal to a high frequency signal to transmit it.

The modulation unit 130 modulates data to transmit.

In order to distinguish each IRPS 100, the PRN code processor 140 generates an intrinsic PRN code. A method of generating and processing the intrinsic PRN code may be easily known by a person of common skill in the art, and therefore a detailed description thereof will be omitted.

The demodulation unit 150 demodulates received data, and a demodulation method may be differently set according to a modulation method.

The time setting unit 160 generates time information using a synchronization signal that is received in the SRSE 300.

The controller 170 controls an entire operation of the IRPS 100, and the memory unit 180 stores information (e.g., IRPS location coordinates) about each IRPS 100.

The auto driving apparatus 200 is mounted in a vehicle, grasps the vehicle's location using a reference location wireless signal that is received from a plurality of IRPSes 100, and controls auto driving of the vehicle based on the grasped location.

Figure 3:
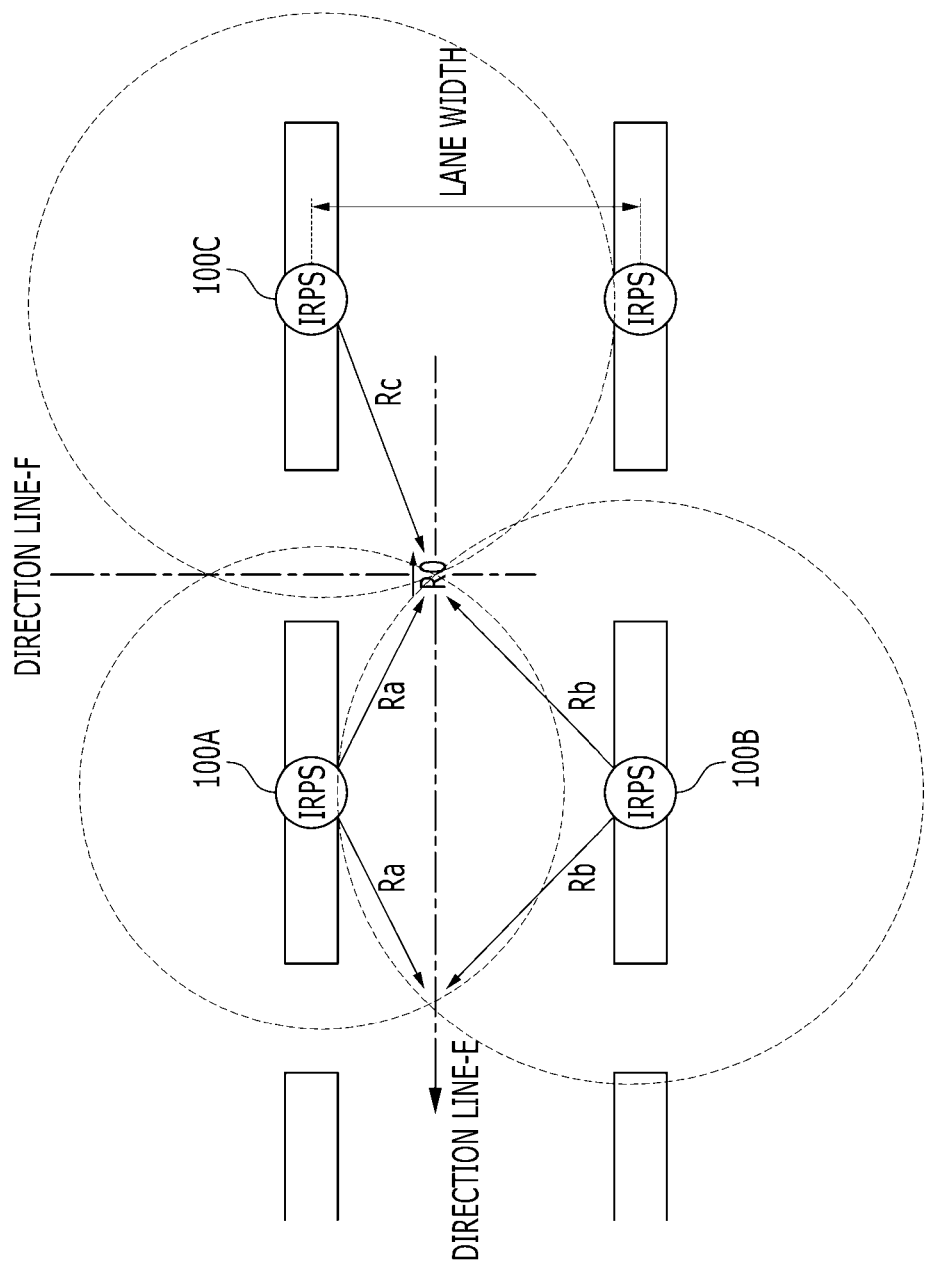
FIG. 3 is a diagram illustrating a method of measuring a vehicle's location in a wireless inducement system according to an exemplary embodiment of the present invention.

FIG. 3 is a diagram illustrating a method of measuring a vehicle's location in a wireless inducement system according to an exemplary embodiment of the present invention.

In FIG. 3, a location thereof in which the auto driving apparatus 200 is to measure is represented by $\vec{R}_0$. It is assumed that the auto driving apparatus 200 receives a reference location wireless signal from IRPSes 100A, 100B, and 100C that are installed in each of at least three lanes. The IRPS 100A and the IRPS 100B each are positioned at adjacent and parallel lanes.

The auto driving apparatus 200 may generate three circular areas that are shown in FIG. 3 using a reference location wireless signal that is received from each of the IRPSes 100A, 100B, and 100C, and may determine a point at which the three circular areas intersect to be a location $\vec{R}_0$ thereof. In other words, the auto driving apparatus 200 extracts an arrival time of the received signal and IRPS location coordinates at a reference location wireless signal that is received from each of the IRPSes 100A, 100B, and 100C, and calculates a location $\vec{R}_0$ thereof using the arrival time and the IRPS location coordinates.

Radius displays Ra, Rb, and Rc of circular areas that are indicated by dotted lines in FIG. 3 indicate an arrival time of a synchronized reference location wireless signal, and the arrival time is calculated through an electric wave sending time of the received reference location wireless signal. The IRPSes 100A, 100B, and 100C each have fixed locations on a road, and have intrinsic numbers and IRPS location coordinates. A method in which the auto driving apparatus 200 calculates a location $\vec{R}_0$ thereof is represented by Equation 1.

$$|\vec{R}_a - \vec{R}_0| = C(\Delta t_a + \Delta t_0)$$

$$|\vec{R}_b - \vec{R}_0| = C(\Delta t_b + \Delta t_0)$$

$$|\vec{R}_c - \vec{R}_0| = C(\Delta t_c + \Delta t_0) \quad \text{(Equation 1)}$$

In Equation 1, $\vec{R}_a$, $\vec{R}_b$, $\vec{R}_c$ are IRPS location coordinates of the IRPSES 100A, 100B, and 100C, respectively, that are installed on a road, and $\vec{R}_a$, $\vec{R}_b$, $\vec{R}_c$ are included in a reference location wireless signal that the auto driving apparatus 200 receives. $\Delta t_b$ is an electric wave arrival time of a reference location wireless signal that the auto driving apparatus 200 receives, and $\Delta t_0$ represents an error of a clock that is included in the auto driving apparatus 200. C represents a speed of an electric wave, i.e., the speed of light. Location coordinates of each of the IRPSes 100A, 100B, and 100C are known values, and therefore the auto driving apparatus 200 obtains a location $\vec{R}_0$ thereof using Equation 2 regardless of $\Delta t_0$, which is an error.

The adjacent IRPS 100A and IRPS 100B that are positioned at parallel lanes maintain a distance of a lane width, and may thus have a meaning of a pair and can increase use thereof using the pair. The auto driving apparatus 200 calculates a direction line E that is shown in FIG. 3 using a reference location wireless signal that it receives from the IRPS 100A and a reference location wireless signal that it receives from the IRPS 100B, and recognizes a distance to the center of a lane through the calculated direction line E. That is, when a vehicle passes through between the IRPS 100A and the IRPS 100B, the auto driving apparatus 200 that is mounted in the vehicle calculates an arrival time of reference location wireless signals that are received from each of two IRPSes 100A and 100B and calculates a distance to the lane center through a difference between the two calculated arrival times. The auto driving apparatus 200 may know how much a location thereof is shifted from the lane center through the calculated distance to a lane center, and may automatically set a direction in toward the lane center using the shifted location.

A detailed configuration of the auto driving apparatus 200 that measures a vehicle's location in this way will be described with reference to FIG. 4.

Figure 4:
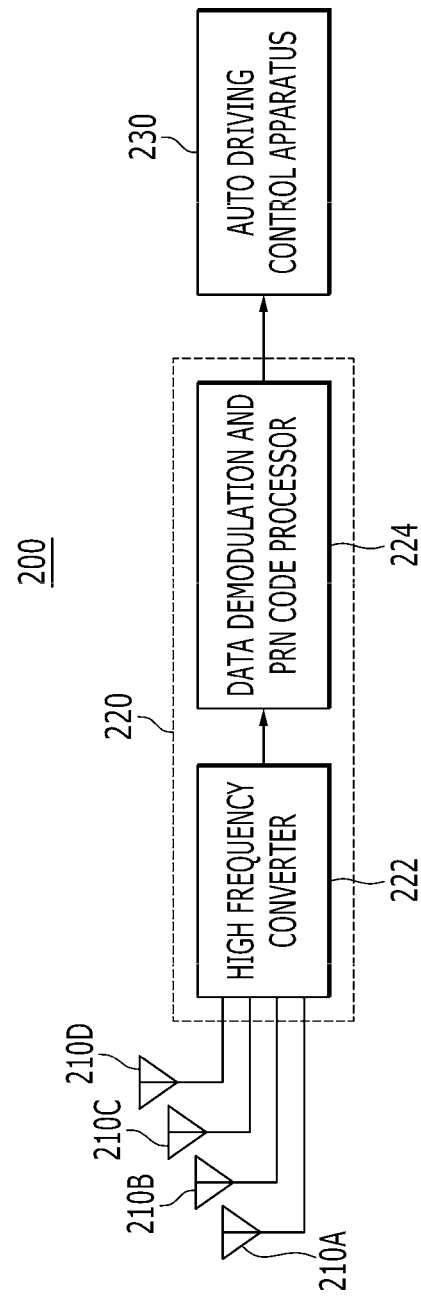
FIG. 4 is a block diagram illustrating a configuration of the auto driving apparatus 200 according to an exemplary embodiment of the present invention.

FIG. 4 is a block diagram illustrating a configuration of the auto driving apparatus 200 according to an exemplary embodiment of the present invention.

As shown in FIG. 4, the auto driving apparatus 200 according to an exemplary embodiment of the present invention includes a plurality of antennas 210A-210D, a positioning information receiving apparatus 220, and an auto driving control apparatus 230.

Figure 5:
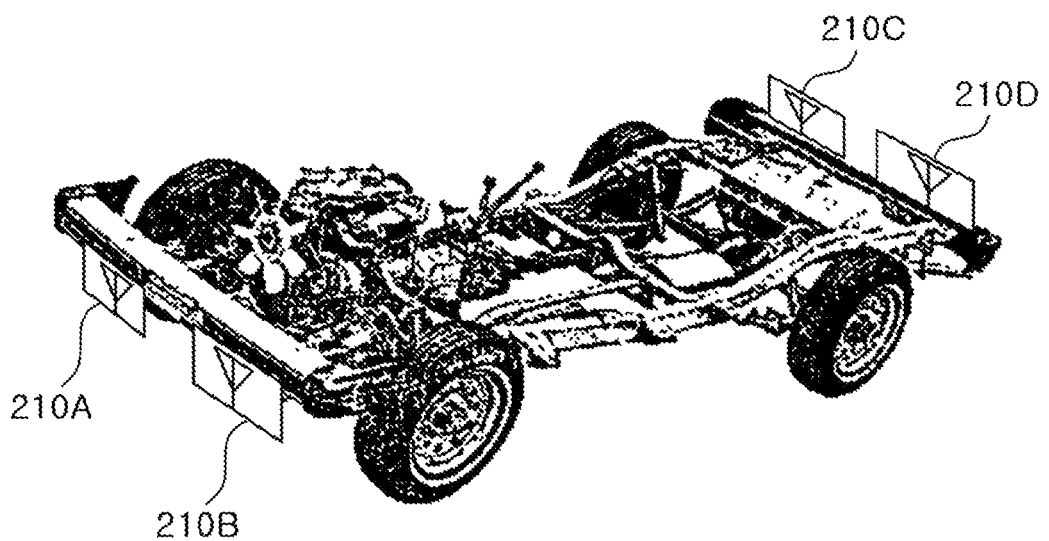
FIG. 5 is a perspective view illustrating that a plurality of antennas 210A-210D of the auto driving apparatus 200 are installed on a vehicle.

The plurality of antennas 210A-210D may be installed at the front and the rear of a vehicle. FIG. 5 is a perspective view illustrating that a plurality of antennas 210A-210D of the auto driving apparatus 200 are installed on a vehicle. As shown in FIG. 5, the antenna 210A is installed at the right front of the vehicle, and the antenna 210B is installed at the left front side of the vehicle. The antenna 210C is installed at the right rear of the vehicle, and the antenna 210D is installed at the left rear of the vehicle. In this method, in order to acquire a variety at front and rear space information and left and right space information of the vehicle, the auto driving apparatus 200 according to an exemplary embodiment of the present invention disposes a plurality of antennas 210A-210D at several locations of the vehicle. In this method, by acquiring space information of several locations through the plurality of antennas 210A-210D, a location and a direction of the vehicle can be more accurately grasped.

The positioning information receiving apparatus 220 includes a high frequency converter 222 and a data demodulation and PRN code processor 224.

The high frequency converter 222 is connected to the data demodulation and PRN code processor 224, and converts a received high frequency signal to a low frequency signal or converts a low frequency signal to a high frequency signal to transmit it.

The data demodulation and PRN code processor 224 compares a PRN code that is previously set therein and a reference location wireless signal that is received from the IRPS 100, and extracts a received signal arrival time value and an intrinsic number of the IRPS 100 using code correlation. The data demodulation and PRN code processor 224 transmits the calculated intrinsic number and the received signal arrival time to the auto driving control apparatus 230.

The auto driving control apparatus 230 calculates a location thereof using the received intrinsic number and received signal arrival time. The auto driving control apparatus 230 may grasp that the received reference location wireless signal is received from which IRPS 100 through the received intrinsic number, thereby knowing an IRPS location coordinates of the IRPS 100. The auto driving control apparatus 230 calculates a location thereof, as represented in Equation 1, using location coordinates and a received signal arrival time.

The auto driving control apparatus 230 provides location information, a driving speed, and direction information (direction line E) thereof by wireless to the SRSE 300, and the auto driving control apparatus 230 receives situation information of an adjacent region from the SRSE 300 and uses the situation information for auto driving.

The auto driving control apparatus 230 sends an intrinsic number and a received signal arrival time to the SRSE 300 without directly calculating a location thereof. In this case, the SRSE 300 calculates a vehicle's location using the intrinsic number and the received signal arrival time, and again transmits the location to the auto driving control apparatus 230. The auto driving control apparatus 230 uses the received location thereof for auto driving.

Such an auto driving control apparatus 230 may be embodied through a smart networked vehicle controller (SNVC).

As shown in FIG. 1, a plurality of SRSEes 300 are installed at the road side or a median strip.

The SRSE 300 supports time synchronization of each group to which the IRPS 100 belongs, and performs a function of managing and monitoring the IRPS 100.

The SRSE 300 collects information through communication with the auto driving apparatus 200 that is mounted in the vehicle. That is, the SRSE 300 collects speed, location coordinates, and advancing direction information of a vehicle driving in an adjacent region through wireless communication. The SRSE 300 provides a situation information service that transmits data that is collected in this way to a vehicle, i.e., the auto driving apparatus 200 of an adjacent region.

The SRSE 300 shares information through communication with another SRSE 300, and exchanges various information through communication with a center control server (not shown in FIG. 1).

Figure 6:
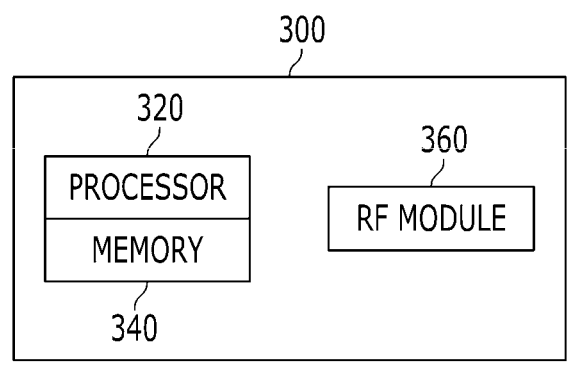
FIG. 6 is a block diagram illustrating a configuration of the SRSE 300 according to an exemplary embodiment of the present invention.

FIG. 6 is a block diagram illustrating a configuration of the SRSE 300 according to an exemplary embodiment of the present invention.

As shown in FIG. 6, the SRSE 300 according to an exemplary embodiment of the present invention includes a processor 320, a memory 340, and a radio frequency (RF) module 360.

The processor 320 is formed to embody functions of the SRSE 300. The memory 340 is connected to the processor 320 and stores various information that is related to operation of the processor 320. The RF module 360 is connected to the processor 320 and transmits or receives a wireless signal. The SRSE 300 may have a single antenna or multiple antennas.

Hereinafter, a method in which the auto driving apparatus 200 grasps a location thereof and performs auto driving according to an exemplary embodiment of the present invention will be described with reference to FIG. 7.

Figure 7:
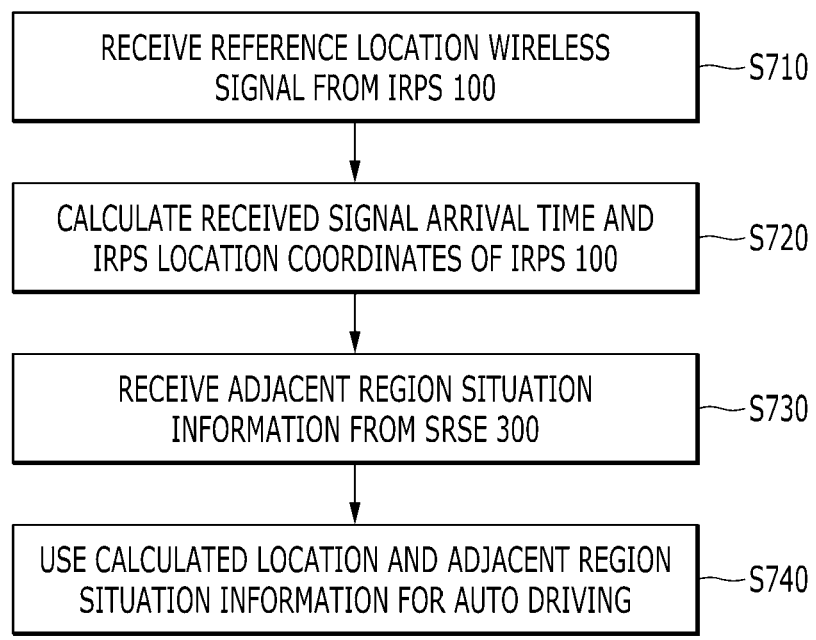
FIG. 7 is a flowchart illustrating an entire operation of the auto driving apparatus 200 according to an exemplary embodiment of the present invention.

FIG. 7 is a flowchart illustrating an entire operation of the auto driving apparatus 200 according to an exemplary embodiment of the present invention.

First, the auto driving apparatus 200 receives a reference location wireless signal from the approaching IRPS 100 (S710). In this case, the auto driving apparatus 200 receives reference location wireless signals from each of at least three IRPSes 100. At least two of three IRPSes 100 may be positioned at adjacent and parallel lanes.

The auto driving apparatus 200 calculates a received signal arrival time and IRPS location coordinates of each IRPS 100 using the received reference location wireless signal (S720). In more detail, the auto driving apparatus 200 compares the received reference location wireless signal and a preset PRN code and compares a reference location wireless signal and extracts a received signal arrival time and an intrinsic number of each IRPS 100 using code correlation. The auto driving apparatus 200 obtains IRPS location coordinates of each IRPS 100 through the extracted intrinsic number.

The auto driving apparatus 200 calculates a location thereof, as represented in Equation 1, using the extracted intrinsic number and received signal arrival time. The auto driving apparatus 200 transmits situation information including the calculated location information thereof to the SRSE 300. Here, the situation information may further include a driving speed and direction information of the auto driving apparatus 200. The SRSE 300 transmits the received situation information to the adjacent auto driving apparatus 200.

The auto driving apparatus 200 receives adjacent region situation information from the adjacent SRSE 300 (S730). Here, the adjacent region situation information is situation information that the SRSE 300 collects from the auto driving apparatus 200, as described above.

Finally, the auto driving apparatus 200 uses a location that is calculated at step S720 and adjacent region situation information that is received at step S730 for auto driving (S740).

According to such an exemplary embodiment of the present invention, because location information of a vehicle can be grasped from an IRPS that is installed in a lane, the vehicle can dynamically set a virtual lane and perform auto driving to a destination. Particularly, when an exemplary embodiment of the present invention is applied to an express highway to drive according to a lane that is drawn on a road, a driver operates an auto driving apparatus when entering a tollgate, and the vehicle can accurately and reliably perform auto driving. Because the vehicle can grasp situation information of an adjacent region through the SRSE, the vehicle can know a state of peripheral vehicles very quickly without directly viewing a motion of the peripheral vehicles. Even at a curved line segment in which a visual field is not secured, an advancing direction situation of the vehicle can be grasped from the SRSE and thus safety driving can be performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless inducement system, comprising:
a plurality of implanted road positioning signalers (IRPSes) that each transmit a reference location wireless signal comprising information about location coordinates and an electric wave sending time of a corresponding one of the plurality of IRPSes, the plurality of IRPSes including a first IRPS that is installed in a first lane line extending in a first direction, a second IRPS that is installed in a second lane line that is parallel and adjacent to the first lane line, the second IRPS disposed opposite to the first IRPS in a second direction perpendicular to the first direction, and a third IRPS that is installed in the first or second lane line;

an auto driving apparatus that receives three reference location wireless signals from the first, second, and third IRPSes, respectively, calculates a location of a vehicle based on arrival times of the three reference location wireless signals from the first, second, and third IRPSes, and performs auto driving using the received reference location wireless signals; and smart roadside equipment (SRSE) that manages the plurality of IRPSes and that transmits situation information about an adjacent region of the vehicle in which the auto driving apparatus is mounted, wherein the location of the vehicle is calculated using the following equations:

$$|\vec{R}_a - \vec{R}_0| = C(\Delta t_a + \Delta t_0)$$

$$|\vec{R}_b - \vec{R}_0| = C(\Delta t_b + \Delta t_0)$$

$$|\vec{R}_c - \vec{R}_0| = C(\Delta t_c + \Delta t_0),$$

wherein $\vec{R}_a$, $\vec{R}_b$, $\vec{R}_c$, and $\vec{R}_0$ are location coordinates of the first, second, and third IRPSes, and the auto driving apparatus, respectively, $\Delta t_a$, $\Delta t_b$, and $\Delta t_c$ are the arrival times of the reference location wireless signals from the first, second, and third IRPSes, C is a speed of an electric wave, and $\Delta t_0$ is an error of a clock included in the auto driving apparatus, the arrival times each corresponding to a traveling time of a reference location wireless signal from a corresponding one of the first, second, and third IRPSes to the vehicle.

2. The wireless inducement system of claim 1, wherein the auto driving apparatus receives a first reference location wireless signal from the first IRPS and a second reference location wireless signal from the second IRPS when the vehicle passes between the first and second IRPSes, calculates a first arrival time of the first reference location wireless signal and a second arrival time of the second reference location wireless signal, and calculates a distance of the vehicle from the center of a lane defined by the first and second lane lines using the first and second arrival times.

3. The wireless inducement system of claim 1, wherein the auto driving apparatus performs the auto driving using the situation information.

4. The wireless inducement system of claim 1, wherein the auto driving apparatus comprises:

a data demodulation and pseudo random noise (PRN) code processor that compares a PRN code that is previously set therein and a corresponding one of the received reference location wireless signals, and that extracts an arrival time of the compared reference location wireless signal and an intrinsic number of a corresponding one of the plurality of IRPSes using code correlation; and an auto driving control apparatus that calculates the location of the vehicle using the intrinsic number and the arrival time.

5. The wireless inducement system of claim 1, wherein the auto driving apparatus transmits speed, location, and advancing direction information of the vehicle to the SRSE.

6. The wireless inducement system of claim 1, wherein the SRSE manages synchronization, a sleep mode, and a wakeup mode of the plurality of IRPSes.

7. The wireless inducement system of claim 1, wherein the plurality of IRPSes each generate the reference location wireless signal using an intrinsic pseudo random noise (PRN) code.

8. An auto driving apparatus that is mounted in a vehicle and that automatically drives without a driver's manipulation, the auto driving apparatus comprising:

a positioning information receiving apparatus that receives three reference location wireless signals from three IRPSes, respectively, and that extracts arrival times of the reference location wireless signals and intrinsic numbers of the IRPSes; and an auto driving control apparatus that calculates a location of the vehicle using the intrinsic numbers and the arrival times of the reference location wireless signals, and that performs auto driving based on the calculated location of the vehicle, wherein the three IRPSes comprise first and second IRPSes installed in first and second lane lines, respectively, the first lane line extending in a first direction, the second lane line being adjacent and parallel to the first lane line, the second IRPS disposed opposite to the first IRPS in a second direction perpendicular to the first direction, the three IRPSes further comprising a third IRPS that is installed in the first or second lane line, wherein the location of the vehicle is calculated using the following equations:

$$|\vec{R}_a - \vec{R}_0| = C(\Delta t_a + \Delta t_0)$$

$$|\vec{R}_b - \vec{R}_0| = C(\Delta t_b + \Delta t_0)$$

$$|\vec{R}_c - \vec{R}_0| = C(\Delta t_c + \Delta t_0),$$

wherein $\vec{R}_a$, $\vec{R}_b$, $\vec{R}_c$, and $\vec{R}_0$ are location coordinates of the first, second, and third IRPSes, and the auto driving apparatus, respectively, $\Delta t_a$, $\Delta t_b$, and $\Delta t_c$ are the arrival times of the reference location wireless signals from the first, second, and third IRPSes, C is a speed of an electric wave, and $\Delta t_0$ is an error of a clock included in the auto driving apparatus, the arrival times each corresponding to a traveling time of a reference location wireless signal from a corresponding one of the first, second, and third IRPSes to the vehicle.

9. The auto driving apparatus of claim 8, wherein the auto driving apparatus receives a first reference location wireless signal from the first IRPS and a second reference location wireless signal from the second IRPS when the vehicle passes between the first and second IRPSes, calculates a first arrival time of the first reference location wireless signal and a second arrival time of the second reference location wireless signal, and calculates a distance of the vehicle from the center of a lane defined by the first and second lane lines using the first and second arrival times.

10. The auto driving apparatus of claim 8, wherein the positioning information receiving apparatus comprises:

a high frequency converter that receives the reference location wireless signals and that converts each of the reference location wireless signals to a low frequency signal; and a data demodulation and pseudo random noise (PRN) code processor that compares a PRN code that is previously set therein and a corresponding one of the reference location wireless signals and that extracts an intrinsic number of a corresponding one of the IRPSes and an arrival time of the compared reference location wireless signal using code correlation.

11. The auto driving apparatus of claim 8, wherein the auto driving apparatus transmits the calculated location of the vehicle and speed and direction information of the vehicle to the SRSE.

12. The auto driving apparatus of claim 11, wherein the auto driving apparatus receives situation information about an adjacent region of the vehicle from the SRSE and performs the auto driving using the situation information.

13. The auto driving apparatus of claim 8, further comprising a plurality of antennas that are installed at a plurality of points, respectively, of the vehicle.

14. A method of driving an auto driving apparatus that is mounted in a vehicle to automatically drive, the method comprising:
receiving a first reference location wireless signal from a first implanted road positioning signaler (IRPS) that is installed in a first lane line extending in a first direction;
receiving a second reference location wireless signal from a second IRPS that is installed in a second lane line that is parallel and adjacent to the first lane line, the second IRPS disposed opposite to the first IRPS in a second direction perpendicular to the first direction;
receiving a third reference location wireless signal from a third IRPS that is installed in the first or second lane line;
calculating a location of the vehicle based on arrival times of the first, second, and third reference location wireless signals; and
performing auto driving of the vehicle based on the calculated location of the vehicle,
wherein the location of the vehicle is calculated using the following equations:

$|\vec{R}_a - \vec{R}_0| = C(\Delta t_a + \Delta t_0)$ $|\vec{R}_b - \vec{R}_0| = C(\Delta t_b + \Delta t_0)$ $|\vec{R}_c - \vec{R}_0| = C(\Delta t_c + \Delta t_0)$, wherein $\vec{R}_a$, $\vec{R}_b$, $\vec{R}_c$, and $\vec{R}_0$ are location coordinates of the first, second, and third IRPSes, and the auto driving apparatus, respectively, $\Delta t_a$, $\Delta t_b$, and $\Delta t_c$ are the arrival times of the reference location wireless signals from the first, second, and third IRPSes, C is a speed of an electric wave, and $\Delta t_0$ is an error of a clock included in the auto driving apparatus, the arrival times each corresponding to a traveling time of a reference location wireless signal from a corresponding one of the first, second, and third IRPSes to the vehicle.

15. The method of claim 14, wherein the first reference location wireless signal from the first IRPS and a second reference location wireless signal from the second IRPS are received when the vehicle passes between the first and second IRPSes, the method further comprising:
calculating a first arrival time of the first reference location wireless signal and a second arrival time of the second reference location wireless signal; and
calculating a distance from a center point that is positioned between the first lane line and the second lane line to the vehicle using the first and second arrival times.

16. The method of claim 15, further comprising setting a direction of the vehicle to the center point using the distance.

17. The method of claim 14, wherein the first, second, and third reference location wireless signals comprise electric wave sending times and location coordinates of the first, second, and third IRPSes, respectively.

18. The method of claim 14, further comprising:
transmitting the calculated location of the vehicle to smart roadside equipment (SRSE);
receiving situation information about an adjacent region of the vehicle from the SRSE; and
performing the auto driving using the situation information.

* * * * *